Patented Oct. 14, 1941

2,259,122

UNITED STATES PATENT OFFICE 2,259,122

STABILIZED POLYMERS OF CHLOROPRENE AND PROCESS OF PRODUCING THE SAME

Herbert W. Walker, Woodstown, N. J., assignor to E. I. du Pont de Nemours & Company, Wilmington, Del., a corporation of Delaware No Drawing. Application January 26, 1940, Serial No. 315,749

15 Claims. (Cl. 260—89)

This invention relates to the treatment of plastic polymers of halogen-2-butadiene-1,3 and their homologues. More specifically, it relates to the treatment of plastic polymers of chloro-2-butadiene-1,3 (hereinafter, for convenience, referred to as chloroprene). More particularly, it relates to stabilization of the plastic polymers of these halogen dienes.

Many of the polymers of chloroprene, and particularly those made in emulsion in the presence of certain modifying agents, are soft and plastic when isolated and lend themselves readily to the common operations of rubber technology, such as milling, calendering, and tubing. The modifying agents herein referred to are those disclosed in the following copending applications: Starkweather, Serial No. 69,739, filed March 19, 1936, which discloses emulsion polymerization of chloroprene in the presence of sulfur dioxide as a modifying agent; Starkweather and Collins, Serial No. 69,737, filed March 19, 1936, which has now matured into U. S. Patent No. 2,163,250, granted June 20, 1939, which discloses emulsion polymerization of chloroprene in the presence of hydrogen sulfide as a modifying agent; and Starkweather and Collins, Serial No. 69,738, filed March 19, 1936, and refiled July 30, 1937 as Serial No. 156,518 which discloses emulsion polymerization of chloroprene in the presence of organic modifying agents. The organic modifying agents which this latter case discloses are unpolymerizable acid-stable organic compounds which are capable of forming an addition product with compounds of the general formula

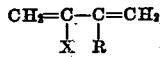

in which X is hydrogen and R is a member of the group consisting of hydrogen and hydrocarbon radicals under conditions of polymerization of such compounds of said general formula. This group of modifying agents includes the following classes of organic chemical compounds:

(1) Unsaturated compounds containing one or more carbonyl groups adjacent to the double bond;
(2) Aromatic sulfinic acids;
(3) Aromatic mercaptans;
(4) Mercapto-carboxylic acids;
(5) Aliphatic mercaptans.

On standing at ordinary temperatures, or sometimes when allowed to warm during milling, polymers made according to the above cases in the presence of the stated modifying agents have a tendency to lose their plasticity and become tough and elastic, even in the presence of antioxidants, such as phenyl beta naphthylamine. Thus, on storage under ordinary conditions, they show a decided tendency to lose their plasticity within periods as short as three months and at temperatures of about 70° C. they exhibit this decided tendency within 24 hours. It thus becomes very difficult or impossible to handle them with ordinary rubber machinery, and, hence, their use is limited.

This application is a continuation-in-part of applicant's copending application Serial No. 154,212, filed July 17, 1937.

It is, therefore, an object of this invention to maintain, in the plastic condition during milling and storage, plastic polymers of halogen-2-butadiene-1,3 and their homologues in which the hydrogen atom on carbon atom 3 is replaced by a hydrocarbon group, particularly plastic heat curable polymers prepared by polymerizing chloroprene in the presence of modifying agents, preferably while the chloroprene is dispersed in an aqueous medium, as disclosed in the applications referred to above. A more specific object is to maintain plastic polymers of chloroprene in the plastic condition during milling and on storage for periods much longer than three months under ordinary conditions. A still further object is to provide means for maintaining the plasticity of these polymers, which means, however, does not substantially reduce their capacity to be converted under curing conditions to the strong elastic state resembling vulcanized rubber. Another object is to provide means for arresting the polymerization of halogen-2-butadiene-1,3, particularly of chloro-2-butadiene-1,3 when they have reached a desired stage of polymerization. Another object is to provide compositions of plastic polymers of halogen-2-butadienes-1,3 and their homologues, particularly compositions of chloroprene plastic polymers, which have a more extensive curing range and a greater maximum tensile strength upon cure. Still another object is to provide means which are capable not only of arresting polymerization, but also of maintaining plastic polymers in the plastic condition during milling and storage and conferring upon them a more extensive curing range and greater maximum tensile strength upon cure. Other objects will appear hereinafter.

With these objects in mind, it has now been discovered that the plasticity of polymers of halogen-2-butadienes-1,3 and their homologues of the general formula

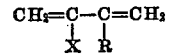

in which X is halogen and R is hydrogen or a hydrocarbon radical, prepared by polymerizing the halogen butadiene in the presence of modifying agents, particularly while it is emulsified in water, for example, as disclosed in the copending applications, identified above, may be retained within desired limits during storage for long periods of time and also under milling conditions without, however, substantially reducing their capacity to be converted under curing conditions to the strong elastic state resembling vulcanized rubber, by having present with them as stabilizers, relatively small amounts of certain compounds containing the nucleus

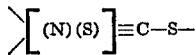

which group, it will be noted, is characterized by having a central carbon, one of the valences of which is satisfied by a sulfur atom and the other three valences of which are satisfied by a nitrogen atom and another sulfur atom together. The invention is particularly applicable to chloroprene plastic polymers although it includes within its scope the stabilization of other halogen butadienes, such as bromo-2-butadiene-1,3 and chloro-2-methyl-3-butadiene-1,3. A more specific group of polymers which are much improved by stabilization are those obtainable by polymerizing the halogen dienes of the above general formula while they are dispersed in an acid aqueous medium in the presence of modifying agents. It will be apparent that of this latter group those obtained from chloroprene are preferred in view of the preference for chloroprene polymers already expressed and because of their many advantageous properties. Further information as to the polymerization of these halogen dienes in the presence of modifying agents may be had by referring to the above-identified copending applications. Attention is also directed to the fact that all of the polymers which are disclosed herein as being susceptible to treatment by the method of this invention, are polymers of the heat curable type, i. e., plastic polymers which are readily cured by heat to the strong elastic state resembling vulcanized rubber.

The following examples are included in order to more fully illustrate the invention, and it should be understood that these examples are given for this purpose alone, and that, accordingly, they are not to be construed as limiting the scope of the invention.

In these examples and throughout this application, whenever the term "plasticity number" is used, it refers to the thickness in thousandths of an inch of a 2.5 cc. sample of the polymer in the form of a cylinder ⅝" in diameter which has been heated to 80° C. for 15 minutes and then kept under a weight of five kilograms for three minutes at 80° C. It will be obvious that the plasticity will vary inversely as the plasticity number, lower plasticity numbers indicating more plastic materials. It has been found that to be milled satisfactorily, a polymer should, in general, have a plasticity number less than 125.

The term "regain" is also used in this application and wherever it occurs herein refers to the gain in thickness in thousandths of an inch of the compressed sample, from the plasticity test, when freed from pressure for one minute at room temperature. For satisfactory milling, this "regain" should, in general, be less than 25. In addition, it should be noted that wherever, throughout these examples, the term "parts" is used, it refers to "parts by weight."

A plastic polymer of chloroprene was prepared according to the method disclosed in a copending application of Starkweather and Collins, Serial No. 69,738, filed March 19, 1936, by polymerizing chloroprene in acid aqueous emulsion in the presence of 0.75 per cent of thioglycolic acid and 0.08 per cent of hydrogen sulfide (both based on the amount of chloroprene used). The dried, finished polymer containing no stabilizer or antioxidant was divided into 2 portions, one of which was treated with 1 per cent of phenyl beta naphthylamine by incorporation on a rubber mill and was retained as a control. The other portion was treated with 1 per cent of phenyl beta naphthylamine and 2 per cent of the compound to be used as stabilizer on a rubber mill. The plasticity numbers and regain of both samples were determined at once and after aging for 24 and 48 hours in an air oven at 70° C. Table I, below, gives the plasticity data thus obtained for polymer treated and untreated with a stabilizer as disclosed herein.

*Table I*

| Example No. | Agent added in addition to phenyl b-naphthylamine | Plasticity number and regain after aging at 70° C. for— | | |
|---|---|---|---|---|
| | | 0 hrs. | 24 hrs. | 48 hrs. |
| 1 | None (control) | 77–1 | 129–66 | 144–73 |
| | Phenyl ethyl carbamyl pentamethylene dithiocarbamate. | 64–4 | 80–2 | 95–1 |
| 2 | None (control) | 102–9 | 184–150 | 202–178 |
| | Tetramethyl thiuram monosulfide. | 87–5 | 101–6 | 110–5 |
| 3 | None (control) | 77–2 | 127–45 | 139–63 |
| | Tetramethyl thiuram disulfide. | 73–2 | 90–2 | 107–2 |
| 4 | None (control) | 96–4 | 123–35 | 316–41 |
| | Dipentamethylene thiuram tetrasulfide. | 83–2 | 103–4 | 113–15 |
| 5 | None (control) | 102–5 | 160–55 | |
| | Dimethyl - thiocarbamyl- 0 - nitro-phenyl-disulfide. | 100–3 | 131–5 | 144–74 |
| 6 | None (control) | 77–2 | 127–45 | 139–63 |
| | Mercapto benzothiazol | 75–3 | 97–5 | 100–6 |
| 7 | None (control) | 77–1 | 129–66 | 144–73 |
| | Sodium benzothiazyl mercaptide. | 84–3 | 106–6 | 127–19 |
| 8 | None (control) | 77–1 | 129–66 | 144–73 |
| | Phenyl benzothiazyl sulfide | 67–3 | 88–2 | 99–5 |
| 9 | None (control) | 77–1 | 129–66 | 144–73 |
| | Dimethyl carbamyl-benzothiazyl sulfide. | 67–2 | 90–3 | 107–3 |
| 10 | None (control) | 77–1 | 129–66 | 144–73 |
| | Pentamethylene carbamyl benzothiazyl sulfide. | 67–3 | 100–3 | 110–7 |
| 11 | None (control) | 77–1 | 129–66 | 144–73 |
| | Phenyl ethyl thiocarbamyl benzothiazyl sulfide. | 68–2 | 96–2 | 110–6 |
| 12 | None (control) | 102–5 | 160–55 | 145–45 |
| | Dibenzothiazyl disulfide | 99–4 | 139–11 | |
| 13 | None (control) | 80–2 | 103–2 | 118–6 |
| | Benzothiazyl furoyl sulfide | 69–2 | 97–2 | 95–4 |

It will be seen from inspection of this table that all the compounds containing the nucleus

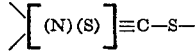

which were added have a very pronounced effect in reducing the change in plasticity on aging at 70° C. A similar improvement over untreated polymer exists as regards the change of plasticity at room temperature, the test at 70° C. being used because it gives in a few days data on change in plasticity which require months to obtain at ordinary temperature.

The stabilizing agent may be added to the polymer at any time after the polymerization has reached the desired stage. Obviously, the greatest protection is secured for the polymer if the stabilizer is added as soon as possible. Thus, a preferred embodiment of this invention consists of treating the freshly prepared polymer, while still dispersed in water, with an aqueous dispersion of the stabilizing agent. For example, dispersions of plastic polymer, prepared as referred to above, by using 100 parts of chloroprene in 400 parts of a 1 per cent aqueous solution of stearyl sulfate sodium salt were mixed with stabilizing dispersions containing one part of phenyl beta naphthylamine and one part of one of the stabilizers shown in the following table. These dispersions were made by first dissolving and dispersing the stabilizer and amine in ten parts of benzene and dispersing in ten parts of the emulsifying solution. The mixed dispersion was then coagulated, by adding saturated sodium chloride solution, washed on a mill with corrugated rolls and dried by further milling on smooth rolls.

The following Table II gives the plasticity numbers and regains determined before and after aging for 24 and 48 hours at 70° C. for polymer thus treated with three representative stabilizers and also for polymer obtained and treated in exactly the same way except that no stabilizer was added.

Table II

| Example No. | Agent added in addition to phenyl b-naphthylamine | Plasticity number and regain after aging at 70° C. for— | | |
|---|---|---|---|---|
| | | 0 hrs. | 24 hrs. | 48 hrs. |
| 14 | None (control) | 85-1 | 182-8 | 182-113 |
| | Tetramethyl thiuram monosulfide | 75-1 | 89-0 | 103-7 |
| 15 | None (control) | 85-1 | 182-8 | 182-113 |
| | Tetramethyl thiuram disulfide | 82-0 | 88-4 | 92-0 |
| 16 | None (control) | 85-1 | 182-8 | 182-113 |
| | Mercapto benzothiazol | 84-1 | 109-8 | 118-8 |

The broad class of compounds which may be used for stabilizing modified plastic polymers has been described above as containing the nucleus

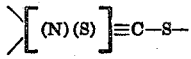

The great bulk of these stabilizers is included by the following general formula A—(S)$_n$—B in which A represents a radical chosen from Group A in the following Table III, S represents sulfur, $n$ is a whole number less than 5, and B represents a radical chosen from Group B in the following table:

Table III

| Group A | Group B |
|---|---|
| (1) $Q_1$ $Q_2$ N—C— ‖ S | (1) $Q_3$ $Q_4$ N—C— ‖ S |
| (2) $D_1$=N—C— ‖ S | (2) $D_2$=N—C— ‖ S |
| (3) $E_1$ C—N C— C—S | (3) $E_2$ C—N C— C—S |
| | (4) $Q_5$ $Q_6$ N—C— ‖ O |
| | (5) $D_3$=N—C— ‖ O |
| | (6) $Q_7$—C— ‖ S |
| | (7) $Q_8$—C— ‖ O |
| | (8) $Q_9$— |
| | (9) H— |

In this table, the letters N, C, S, H, and O have their usual significance.

$Q_1$, $Q_2$, $Q_3$, $Q_4$, $Q_5$, $Q_6$, $Q_7$, $Q_8$, and $Q_9$ are such monovalent radicals as (a) aliphatic hydrocarbon radicals, (b) aromatic hydrocarbon radicals, (c) hydroaromatic hydrocarbon radicals, (d) heterocyclic radicals with oxygen and carbon forming the ring, (e) heterocyclic radicals with sulfur and carbon forming the ring, (f) radicals similar to those described in a, b, c, d, and e, but differing only in that one or more of the hydrogen atoms is replaced by an atom or group such as halogen, nitro, acetyl, sulfo, alkoxyl and the like, (g) complex radicals consisting of more than one of the radicals described in a, b, c, d, e, and f.

$D_1$, $D_2$, and $D_3$ are carbon chains with a free bond on each end carbon; they may consist of carbon and hydrogen or they may consist of carbon, hydrogen, and one or more atoms or groups such as halogen, nitro, acetyl, sulfo, alkoxyl and the like; all of the carbons in the group need not be in the chain, but it should consist of at least two carbon atoms.

$E_1$ and $E_2$ are groups such that the radicals

and

are aromatic nuclei; these nuclei may be composed entirely of carbon and hydrogen, may have some of the carbon atoms outside the ring, and may also have substituent groups or atoms such as halogen, nitro, acetyl, sulfo, alkoxyl and the like.

Specific illustrations of suitable stabilizers have been given in the above examples which also show how they may be incorporated and what their effect is. A number of additional compounds coming within the scope of this broad definition are given in the following discussion to further illustrate the scope of the invention. The groups represented by A and B may either be the same, as illustrated by tetramethyl thiuram mono- and di-sulfides and by dibenzothiazyl disulfide, or they may be selected from the respective groups in any combination, as illustrated by:

Phenylethyl-carbamyl-dimethyl-dithiocarbamate
Dimethyl-thiocarbamyl-thioacetyl-sulfide
Dimethyl-thiocarbamyl-nitrophenyl-disulfide
Benzothiazyl-dimethyl-dithiocarbamate
Benzothiazyl-dimethyl-carbamyl-sulfide
Benzothiazyl-furoyl-sulfide
Mercapto-benzo-thiazol.

It will be noted that free disubstituted dithiocarbamic acids are also included by the general formula A—(S)$_n$—B. These free acids are ordinarily so unstable that they cannot be added as such to the polymer. It is possible, however, to add salts of these acids to the polymer in such a way that the free acids are liberated and act as stabilizer. Thus, the piperidine salt of pentamethylene dithiocarbamate used in place of the compounds in Table II effectively stabilized the polymer.

In the formula A—(S)$_n$—B, $n$ may be any number less than five, as illustrated by:

Tetrabutyl-thiuram-monosulfide
Tetramethyl-thiuram-disulfide
Dipentamethylene-thiuram-tetrasulfide.

The monovalent radicals represented by $Q_1$, $Q_2$, $Q_3$, $Q_4$, $Q_5$, $Q_6$, $Q_7$, $Q_8$, and $Q_9$ may be the same, as in tetramethyl-thiuram-disulfide, or different in the same compound, as in phenylethyl-carbamyl-dimethyl-dithiocarbamate. As illustrated in part by the compounds already mentioned, the monovalent radical, $Q_1$, $Q_2$, $Q_3$, $Q_4$, $Q_5$, $Q_6$, $Q_7$, $Q_8$, and $Q_9$, may be an aliphatic radical (such as methyl, ethyl, allyl, normal-, secondary-, tertiary-, and isobutyl, hexyl and cetyl), aromatic (such as phenyl, biphenyl and naphthyl), hydro-aromatic (such as cyclohexyl and bornyl), heterocyclic with oxygen or sulfur as the hetero-element (as in thienyl and furfuryl), or may be composed of more than one of the above (as, for example, in benzyl, xylyl, benzofuranyl and methyl-cyclohexyl). The pentamethylene group which occurs in several of the compounds mentioned above and below is illustrative of the type of radical represented by $D_1$, $D_2$, and $D_3$.

All the groups represented by $Q_1$, $Q_2$, $Q_3$, $Q_4$, $Q_5$, $Q_6$, $Q_7$, $Q_8$, $Q_9$, and by $D_1$, $D_2$, and $D_3$, as well as the aromatic nucleus of the thiazyl radical, represented by

and

as has been indicated above, may also have one or more of their hydrogen atoms substituted by atoms or groups such as the halogen, nitro, acetyl, sulfo, alkoxyl and the like. Such substitution is often advantageous in increasing the solubility of the reagent and thus making it more readily introduced or utilized. It should be noted, however, that the presence of amino and phenolic groups sometimes tends to interfere with the stabilizing action. The presence of these groups may be desirable, however, when the A—(S)$_n$—B compound is used for arresting polymerization or for its effect upon the curing of the polymer.

Other representatives of this general class of compounds than those given in the examples and above description will be found to be operative. For example, the following may be used:

Dimethyl carbamyl dimethyl dithiocarbamate
Dinitro phenyl pentamethylene dithiocarbamate
Tetraethyl thiuram disulfide
Dipentamethylene thiuram disulfide
Benzyl pentamethylene dithiocarbamate
Diphenyl diethyl thiuram disulfide
Phenyl dibutyl dithiocarbamate
Tolyl phenyl ethyl dithiocarbamate
b-Phenyl ethyl xylyl methyl dithiocarbamate
p-Diphenyl diisoamyl dithiocarbamate
Propyl dicetyl dithiocarbamate
Crotonyl dicyclohexyl dithiocarbamate
Cetyl naphthyl methyl dithiocarbamate
b-Naphthyl dipropyl dithiocarbamate
Decyl benzyl ethyl dithiocarbamate
Benzoyl diethyl dithiocarbamate
Acetyl phenyl methyl dithiocarbamate
Dibutyl carbamyl phenyl propyl dithiocarbamate
p-Acetyl phenyl sulfur diallyl dithiocarbamate
2-Chloro-1-naphthyl sulfur dimethyl dithiocarbamate
Dinaphthyl dimethyl thiuram monosulfide
Dichlor diphenyl diethyl thiuram monosulfide
Dinitro diphenyl dipropyl thiuram monosulfide
Phenyl sodium sulfonate diethyl dithiocarbamate
Nitro ortho diphenyl dimethyl dithiocarbamate
Dipentamethylene thiuram monosulfide
Nitro naphthyl pentamethylene dithiocarbamate
Dinitro diphenyl dibutyl thiuram disulfide
Distearyl dimethyl thiuram disulfide
Tetracetyl thiuram disulfide
Dinaphthyl dimethyl thiuram disulfide
Tetraisopropyl thiuram tetra sulfide
Tetrabrom diphenyl dimethyl thiuram tetra sulfide
Tetrabutyl thiuram disulfide
Potassium nitro benzothiazyl mercaptide
Ammonium chlor nitro benzothiazyl mercaptide
Ethyl benzothiazyl sulfide
Cetyl benzothiazyl sulfide
Crotonyl benzothiazyl sulfide
Benzyl benzothiazyl sulfide
Tolyl benzothiazyl sulfide
Dinitro phenyl benzothiazyl sulfide
Dibrom phenyl benzothiazyl sulfide
b-Naphthyl benzothiazyl sulfide
Nitro p-diphenyl benzothiazyl sulfide
Benzoyl benzothiazyl sulfide
Acetyl benzothiazyl sulfide
Methyl tolyl carbamyl benzothiazyl sulfide
Phenyl benzothiazyl disulfide
Tetrabutyl thiocarbamyl benzothiazyl sulfide
Chloro phenyl propyl thiocarbamyl nitro benzothiazyl sulfide
Dinitro dibenzothiazyl disulfide
Nitro dibenzothiazyl disulfide
Chlor dinitro dibenzothiazyl disulfide The preferred stabilizers are those containing one and preferably two dialkyl thiocarbamyl groups and of these preferred thiuram sulfides the disulfides, such as tetramethyl-thiuram-disulfide, have been found particularly good.

The amount of reagent successfully used as stabilizer may be varied over a wide range. An amount equal to about 0.1 per cent of the polymer is, in general, the minimum which gives a substantial effect. As progressively larger proportions are used, the stabilizing effect increases very rapidly at first, but when the proportion is increased beyond 1 or 2 per cent, the additional increase in stability is ordinarily slight. Since, however, as pointed out below, many of the stabilizers included in the present invention have still other effects upon the polymers to which they are added, the choice of the proportion of agent added depends upon a consideration of all its effects. Ordinarily, about 1 to 2 per cent is preferred although the use of much lower and much higher percentages (up to 5 and more) is included within the scope of this invention and is in certain cases desirable. It is sometimes desirable to add two or more stabilizers, which may be selected entirely from those disclosed in the present application or one of which may be selected from those disclosed in the copending applications of Walker, Serial No. 69,740, filed March 19, 1936, and Starkweather and Collins, Serial No. 196,186, filed March 16, 1938. Except when two stabilizers react with each other (in which case their combined use is not desirable) their stabilizing effects are, in general, additive, i. e., if one is present and another is added, it will increase the stabilizing effect. The amount of stabilizer added should be, at least, such that the total amount of stabilizer present after the addition is sufficient to produce a definite stabilizing effect, i. e., about 0.1 per cent to 5.0 per cent, based on the weight of the polymer as disclosed above.

It will be noted that as disclosed in this and a copending application of Walker, Serial No. 69,740, filed March 19, 1936, many of the organic modifying agents disclosed in the Starkweather and Collins application, Serial No. 156,518, filed July 30, 1937, and many of the accelerating agents disclosed in the Youker application, Serial No. 252,914, filed January 26, 1939, are also effective as stabilizing agents. It will also be noted that the long chain quaternary ammonium salts, disclosed as emulsifying agents for use in the emulsion polymerization of chloroprene, etc., in the presence of modifying agents are also effective stabilizing agents, as disclosed in the copending application of Starkweather and Collins, Serial No. 196,186, filed March 16, 1938. Certain of these modifying agents and accelerating agents are, however, largely consumed during the polymerization under some conditions and the amounts of those emulsifying agents which are also stabilizing agents and which are present during the polymerization are frequently insufficient to produce the stabilizing effect desired in the finished polymer or else a portion of them is lost during some stage of the process. In general, therefore, even though there are present during the formation of a particular polymer some of the agents which are effective, both during the polymerization and as stabilizers, it may be desirable to add additional stabilizing agent to the polymer after the polymerization has reached the desired stage or at some later stage of the process in order to obtain the desired stabilizing effect in the final product.

Even when the polymer is sufficiently stable without the further addition of stabilizers, the addition of certain of the reagents of the present invention may still be desirable in order to produce the other effects discussed below.

For the purpose of this invention, the stabilizing agents may be added at any time after the polymerization process has been carried to the desired point. Thus, as illustrated above, it may be added either to the polymer dispersion or to the dry, finished polymer. It may also be added at any stage intermediate between these two, to the wet coagulum, for example, or portions of the stabilizer may be added at two or more different stages.

As described above, the stabilizer may be incorporated into the coagulated or finished polymer or mixed with the dispersed polymer before coagulation. In the first case, the incorporation is most easily carried out by adding the reagent, either as such or dissolved in a suitable solvent, to the polymer while it is being worked on a rubber mill or in other mixing devices known in the rubber art. This method is preferred when the stabilizer is appreciably soluble in water. For incorporating the stabilizer into the polymer dispersion, the former is dispersed, preferably in the same dispersion medium as used for the polymer by any of the known methods applicable to such a system. This process is often facilitated by first dissolving the stabilizer in a suitable solvent, such as benzene, which is not miscible with the water. Still other methods of incorporation will be obvious to those skilled in the art.

There are certain advantages connected with the incorporation of the stabilizer into the polymer while it is still dispersed. For example, it is frequently much more readily incorporated under such circumstances. Moreover, since the function of the stabilizer is to retain the polymer in a selected state of plasticity, it is obviously desirable in most cases to add the stabilizer to the polymer as soon as possible after it has reached that state. Other advantages will be apparent from the further disclosure appearing below.

The stabilizer may be added in the form of a salt from which the stabilizer itself is subsequently liberated. For example, the mercaptothiazols may be added to the polymer dispersions in the form of dilute solutions of their sodium salts and later liberated in the dispersion by adding dilute acid. Alternatively, as in Example 7, the dry sodium salt may be incorporated in the dry polymer. It is believed that in this case the sodium salt reacts with traces of acid in the polymer, thereby forming the free mercaptan.

The foregoing examples and discussion have been principally concerned with polymers to which an antioxidant, such as phenyl beta naphthylamine, as well as a stabilizer of the general formula $A-(S)_n-B$ has been added. Since polymers so treated in general are considerably more stable than those treated with $A-(S)_n-B$ compound but no antioxidant, the polymers treated with both are the preferred embodiment of the present invention. The $A-(S)_n-B$ compounds have a considerable stabilizing action on the polymers in the absence of antioxidants, however, and consequently polymers stabilized in the absence of antioxidants are included within the scope of this invention.

In addition to their stabilizing action, the compounds described by the general formula $A-(S)_n-B$ as defined above have several other advantageous effects upon the polymer or upon the process by which it is prepared. Thus, when A is a thiazyl radical in which the two adjacent carbon atoms also form part of an aromatic nucleus, $n$ is 1, and B is a hydrogen atom, the compounds thus defined (mercapto-benzothiazol, for example) accelerate the emulsion polymerization of the chloroprene and related compounds, as disclosed in a copending application of Youker application Serial No. 252,914, filed January 26, 1939, and noted above. It has now been found that when one or preferably both of the radicals "A" and "B" in the general formula are disubstituted thiocarbamyl radicals, the resulting thiuram sulfides have two important effects in addition to their stabilizing action. When added to the polymer dispersion, they effectively arrest the further polymerization of the residual chloroprene, which, if allowed to continue, might decrease the plasticity of the polymer to an undesirable extent. The importance of thus arresting the polymerization at the desired point has already been pointed out in the copending applications of Starkweather and Collins already referred to and it has been shown therein that an antioxidant such as phenyl betanaphthylamine may be used. It has now been found that the thiuram sulfides, particularly the disulfides, are much more effective than phenyl betanaphthylamine for this purpose and that, in fact, they may, in general, be employed to arrest polymerization without particular regard to the conditions under which the polymerization is carried out and whether or not other stabilizing agents have been or are to be added. On the other hand, they, obviously, could not be used when special conditions of any sort existed which would render them ineffective.

The second additional effect of the thiuram sulfides is to increase the tensile strength of the cured polymers. This effect is particularly noticeable when the time of cure is either longer or shorter than that required to give maximum tensile strength. Consequently, the use of the thiuram sulfide extends the "curing range" in addition to increasing the maximum tensile strength.

The minimum quantity of thiuram sulfide necessary to arrest the chloroprene polymerization effectively lies between about 0.2 per cent to 1.0 per cent. Larger proportions may also be used. It has been found, however, that the maximum effect upon cure is obtained when about 1 per cent of the reagent is present in the polymer to be cured.

These further effects of the thiuram compounds are illustrated by the following examples, which are not intended to be construed as limiting the invention, however.

*Example 17*

One hundred parts of chloroprene were dispersed and polymerized at 40° C. in 400 parts of a 1 percent aqueous solution of the sodium salt of sulfated oleyl acetate containing 0.75 part of thioglycolic acid and 0.06 part of hydrogen sulfide as described in connection with the preceding examples. When the density (measured at 20° C.) reached 1.0275, indicating that 65 per cent of the chloroprene had polymerized, one part of tetramethyl thiuram disulfide, dispersed in a small volume of the dispersion solution, was added to the dispersion, which was allowed to cool slowly to 20° C. No further polymerization took place during four days. In an exactly similar experiment in which no disulfide was added, an additional 8 per cent of the chloroprene polymerized in 1.5 hours. Di-pentamethylene-thiuram-disulfide and tetra-methyl-thiuram-monosulfide used in place of the tetramethyl-thiuram-disulfide completely arrested polymerization for 18 hours, but thereafter allowed a very slow polymerization to take place.

This example is given to show the functioning of thiuram compounds under extreme conditions. In practice, however, the polymerization is carried on until at least 75 per cent and preferably 85 per cent to 95 per cent of the chloroprene is transformed before arresting the reaction and an antioxidant, such as phenyl beta-naphthylamine is added along with the thiuram sulfide. In this connection, it will be appreciated that, in general, the need for agents to arrest polymerization is greater the greater the speed at which polymerization is conducted. The effect of these compounds upon the tensile strength is illustrated by the following example.

*Example 18*

One hundred parts of chloroprene polymer, prepared as described in Example 15 (except that the sodium salt of sulfated oleyl acetate was used as emulsifying agent instead of stearyl sulfate, and only 0.5 part of phenyl betanaphthylamine was added along with the one part of tetramethyl-thiuram-disulfide) were compounded on a rubber mill with 5 parts of zinc oxide, 10 parts of magnesium oxide, and 5 parts of rosin and cured for 30 minutes at 153° C. The resulting highly elastic product had a tensile strength of 3100 pounds per square inch. When tetra-methyl-thiuram-monosulfide was used instead of the disulfide, the tensile strength was 2900 pounds. When no thiuram sulfide was used, the tensile strength was only 2500 pounds. This example incidentally shows that the stabilizer does not reduce the capacity of the plastic polymer to be converted to the elastic state.

*Example 19*

One hundred parts of chloroprene containing 0.25 part of octyl mercaptan were dispersed in 300 parts of a 1 per cent aqueous solution of the sodium salt of sulfated oleyl acetate as in the preceding examples and polymerized at 40° C. until the density of the dispersion was 1.040. One-half part of phenyl-beta-naphthylamine and 1 part of tetra methyl thiuram disulfide were then incorporated as in Example 15. The polymer was then isolated as in the above example and was found to have a plasticity number of 75 and a recovery of 2. After aging for 48 hours at 70° C., plasticity number was 83 and the recovery was 0, indicating that the polymer had been satisfactorily stabilized by the treatment used.

When the thiuram sulfides are added to arrest polymerization at the desired stage, unless definite steps are taken to effect their elimination, these compounds remain in the polymer after coagulation to exert the stabilizing effect upon it during milling and storage as well as to confer upon it the additional properties mentioned above. Thus, when polymerization is carried out in acid aqueous emulsion in the presence of a modifying agent and is arrested with a thiuram sulfide as in the preferred procedure, illustrated in Examples 14 and 15, full advantage is taken of all the desirable effects which may be produced by the thiuram sulfides.

The stabilized polymer dispersion may be employed as such or the polymer may be isolated as a plastic mass. The uses of these polymer dispersions and the methods suitable for isolating the polymer are very similar to those disclosed in connection with the disclosure of the dispersions obtainable by modified polymerization, which appears in copending applications above identified. Of course, if the polymer is given any treatment following the addition or the adjustment of the amount of a stabilizer desired, which results in a loss of an appreciable amount of the stabilizer, it should be replaced at a later stage of the process, preferably during the final milling step, that is, if the amount lost decreases the amount present below the desired content.

It is also possible to effect the addition of the stabilizers disclosed herein by a continuous process as well as a batch process. This is conveniently accomplished by bringing together a stream of a dispersion of the polymer and a stream of a dispersion of the stabilizer in such a manner that they are thoroughly mixed. The amount of stabilizer added is obviously readily controlled by controlling the rates of flow of the two streams. It is, of course, clear that the stream comprising the polymer as well as that comprising the stabilizer need not be a dispersion. Solutions may, for example, be used. Obviously, however, whether one or both streams be a solution or a dispersion, means should be provided to mix them thoroughly, if thorough mixing does not otherwise take place.

Continuous emulsification combined with continuous polymerization and also combined with continuous addition of antioxidant is disclosed in the copending applications, identified above, which relate to modified polymerization and the combination of continuous addition of stabilizer as described herein with continuous production of polymer as described in those applications has been found to be very desirable. Thus, a stream of a dispersion of a stabilizer as disclosed herein is admitted into the pipe through which the dispersion of the polymer from the continuous polymerization is flowing, so that the two are thoroughly and continuously mixed. The amount of the stabilizer added is readily controlled by varying the rate at which the dispersion of the stabilizer is admitted into contact with the polymer dispersion. This will serve to illustrate the method. Obviously, continuous production of stabilized polymer may be obtained without rigidly adhering to the particular scheme described. The present invention, therefore, is not limited to this exact method for continuous operation.

It is also possible to incorporate the antioxidant, for example, phenyl betanaphthylamine continuously in like manner, if an antioxidant is to be added. As disclosed above, the preferred procedure includes the addition of an antioxidant. The antioxidant may be added continuously, either as a separate stream as disclosed in the applications describing modified polymerization or it may be included in the same stream in which the stabilizer is included and, in fact, this latter variation has been found to be very convenient.

The uses of the polymer produced according to this invention are the same as those disclosed for the polymer obtained according to the processes disclosed in the copending applications, above referred to, which disclose the modified polymerization and the advantages of the present invention are apparent from the above description. The compositions produced by the process of this invention are novel as well as useful. These plastic polymer compositions possess the novel property of remaining in the plastic state for much longer periods than any previously known compositions of such polymers, but are substantially as readily converted under curing conditions to highly elastic products as they would be if the polymers had not been treated with a stabilizer as described herein. The stabilized polymers exhibit no substantial tendency to lose their plasticity on storage under ordinary conditions for periods substantially in excess of three months or in the accelerated aging test at 70° C. for periods in excess of 24 hours.

It is apparent that many widely different embodiments of this invention may be made without departing from the spirit and scope thereof, and, therefore, it is not intended to be limited except as indicated in the appended claims.

I claim:

1. A composition comprising a stabilizer and a heat curable plastic polymer of a compound of the general formula

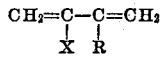

in which X is halogen and R is a member of the group consisting of hydrogen and hydrocarbon radicals obtained by polymerizing a compound of the general formula in the presence of a modifying agent of the group consisting of hydrogen sulfide, aliphatic mercaptans, aromatic mercaptans, and mercapto carboxylic acids, said stabilizer being a compound containing the nucleus

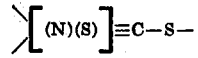

2. A composition as described in claim 1, further characterized in that the compound of the general formula is chloro-2-butadiene-1,3.

3. A composition comprising a stabilizer and a heat curable plastic polymer of chloro-2-butadiene-1,3 obtained by polymerizing chloro-2-butadiene-1,3, while dispersed in water, in the presence of a small amount of a modifying agent of the group consisting of hydrogen sulfide, aliphatic mercaptans, aromatic mercaptans, and mercapto carboxylic acids, said stabilizer being a compound containing the nucleus

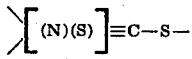

4. A composition comprising a stabilizer and a heat curable plastic polymer of chloro-2-butadiene-1,3 obtained by polymerizing chloro-2-butadiene-1,3, while dispersed in an acid aqueous medium, in the presence of a small amount of a modifying agent of the group consisting of hydrogen sulfide, aliphatic mercaptans, aromatic mercaptans, and mercapto carboxylic acids, said stabilizer being a compound containing the nucleus

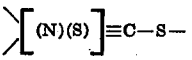

5. The process which comprises incorporating a stabilizer into a heat curable plastic polymer obtained by polymerizing chloro-2-butadiene-1,3, while dispersed in water, in the presence of a small amount of a modifying agent of the group consisting of hydrogen sulfide, aliphatic mercaptans, aromatic mercaptans, and mercapto carboxylic acids, said stabilizer being a compound containing the nucleus

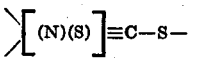

6. The process which comprising polymerizing chloro-2-butadiene-1,3, while dispersed in an aqueous acid medium, in the presence of a small amount of a modifying agent of the group consisting of hydrogen sulfide, aliphatic mercaptans, aromatic mercaptans, and mercapto carboxylic acids, and then, when the polymerization has reached the desired stage, adding to the dispersion a composition which will arrest the polymerization including a compound containing the nucleus

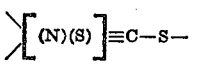

7. The process for continuously incorporating a stabilizer into a heat curable plastic polymer of chloro-2-butadiene-1,3 obtained by polymerizing the chloro-2-butadiene-1,3, while dispersed in water, in the presence of a modifying agent of the group consisting of hydrogen sulfide, aliphatic mercaptans, aromatic mercaptans, and mercapto carboxylic acids, said stabilizer being a compound containing the nucleus

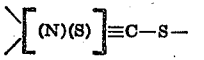

which comprises bringing together a stream comprising the polymer and a stream comprising the stabilizer which is miscible with the stream comprising the polymer.

8. The process of claim 7, further characterized in that the stabilizer contains a disubstituted thiocarbamyl radical.

9. A composition as described in claim 3, further characterized in that the stabilizer contains a dialkyl thiocarbamyl group.

10. A composition as described in claim 3, further characterized in that the stabilizer contains two dialkyl thiocarbamyl groups.

11. A composition as described in claim 3, further characterized in that the stabilizer is tetramethyl thiuram disulfide.

12. The process which comprises dispersing about 100 parts, by weight, of chloro-2-butadiene-1,3 in about 400 parts, by weight, of an aqueous solution of about 1 per cent of stearyl sulfate sodium salt containing about 0.75 part of thioglycolic acid and about 0.06 part hydrogen sulfide and then polymerizing the dispersed chloro-2-butadiene-1,3 until about 85 per cent to 95 per cent of the chloro-2-butadiene-1,3 has polymerized, and then adding a dispersion of about 1 part by weight of phenyl betanaphthylamine and about 1 part by weight of tetramethyl thiuram disulfide dissolved in about 10 parts by weight of benzene and dispersed in about 10 parts by weight of a 1 per cent aqueous solution of stearyl sulfate sodium salt, and coagulating, washing, and drying the polymerized chloro-2-butadiene-1,3.

13. A composition comprising a stabilizer and a heat curable plastic polymer of chloro-2-butadiene-1,3 obtained by polymerizing chloro-2-butadiene-1,3 while dispersed in an aqueous medium in the presence of a small amount of hydrogen sulfide, said stabilizer being a compound containing the nucleus

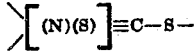

14. A composition comprising a stabilizer and a heat curable plastic polymer of chloro-2-butadiene-1,3 obtained by polymerizing chloro-2-butadiene-1,3 while dispersed in an acid aqueous medium in the presence of a small amount of an unpolymerizable acid-stable mercapto-carboxylic acid, said stabilizer being a compound containing the nucleus

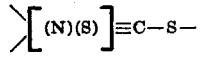

15. A composition comprising a stabilizer and a heat curable plastic polymer of chloro-2-butadiene-1,3 obtained by polymerizing chloro-2-butadiene-1,3 while dispersed in an acid aqueous medium in the presence of a small amount of an unpolymerizable acid-stable aliphatic mercaptan, said stabilizer being a compound containing the nucleus

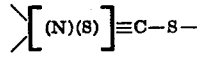

HERBERT W. WALKER.